No. 886,921. PATENTED MAY 5, 1908.
E. R. BAILEY.
CREAM SEPARATOR.
APPLICATION FILED JAN. 17, 1907.
2 SHEETS—SHEET 1.
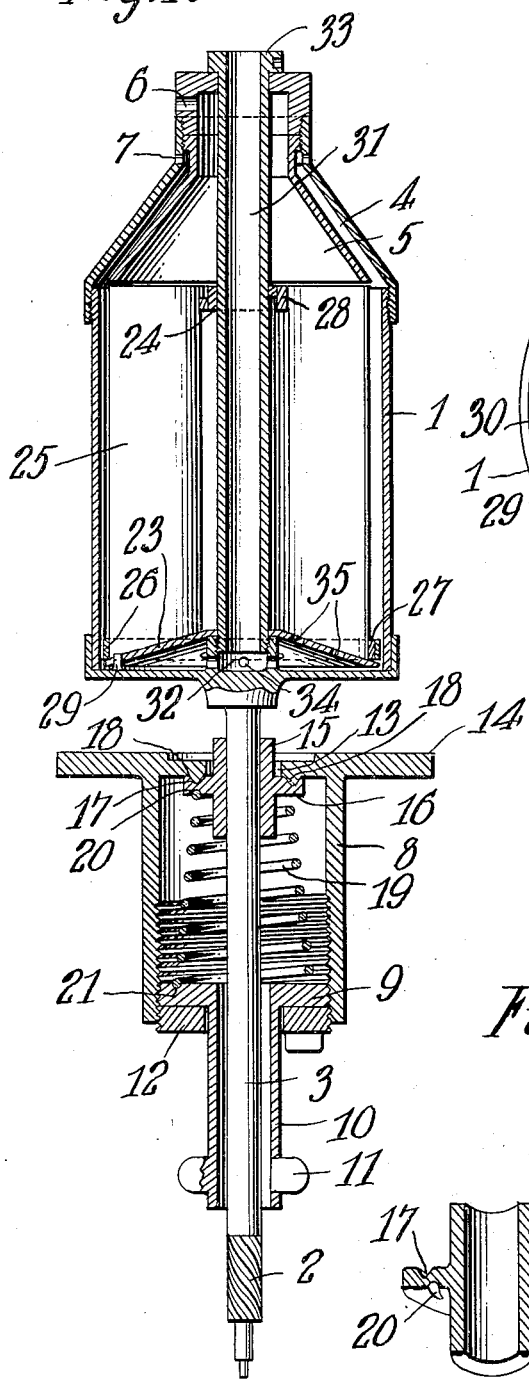
Fig. 1.
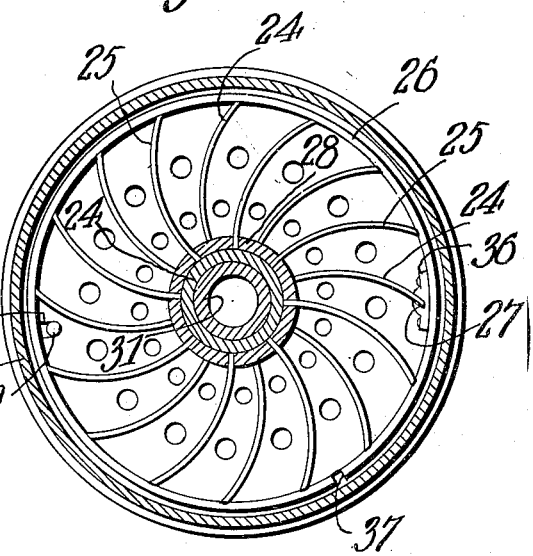
Fig. 2.
Fig. 6.
Fig. 7.
Witnesses
C. E. Smith.
C. H. Griesbauer.
Inventor
E. R. Bailey.
by H. R. Willison & Co
Attorneys

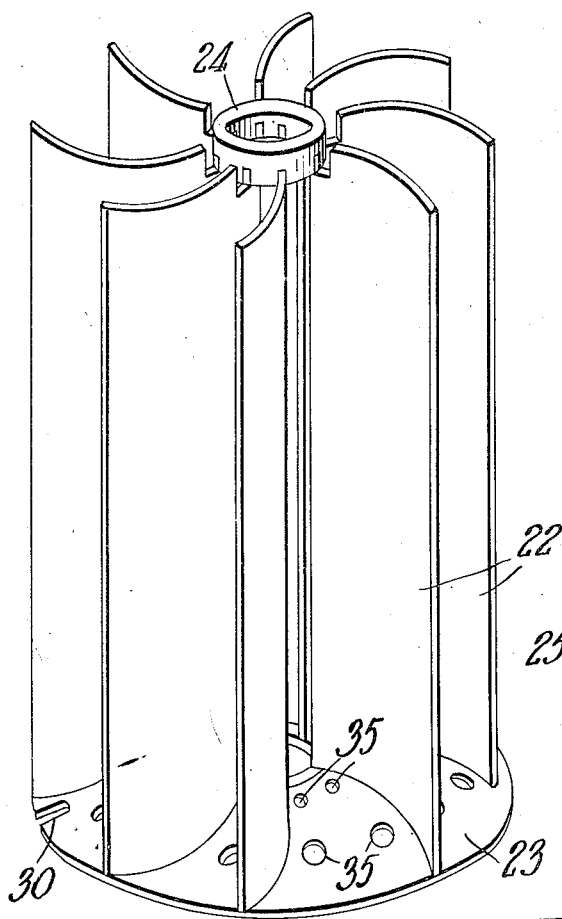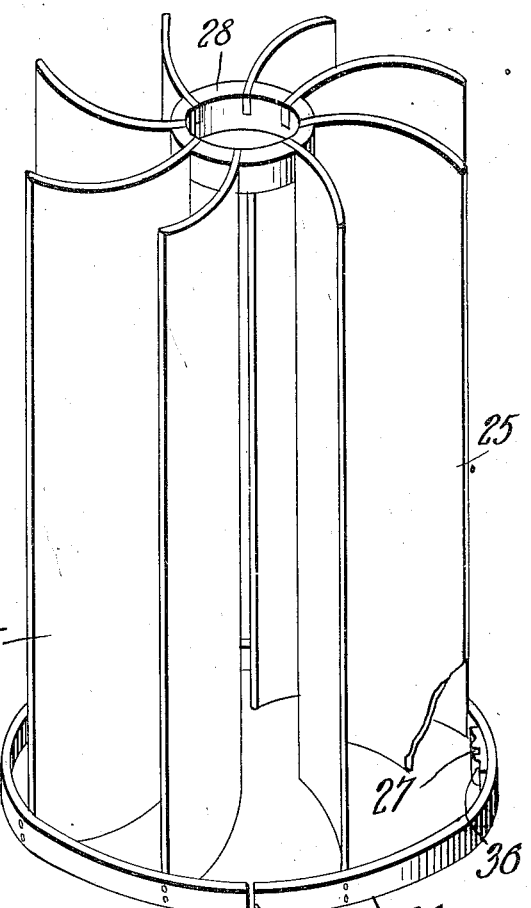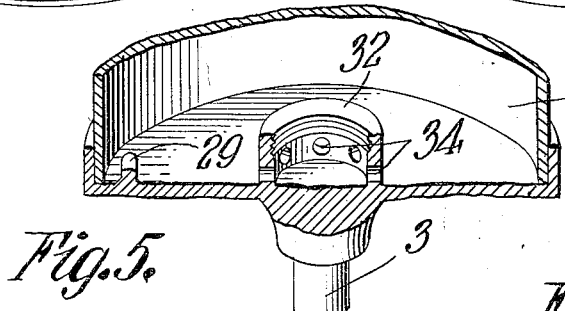

UNITED STATES PATENT OFFICE.

EDGERLY R. BAILEY, OF CLARINDA, IOWA.

CREAM-SEPARATOR.

No. 886,921.      Specification of Letters Patent.      Patented May 5, 1908.

Application filed January 17, 1907. Serial No. 352,779.

*To all whom it may concern:*

Be it known that I, EDGERLY R. BAILEY, a citizen of the United States, residing at Clarinda, in the county of Page and State of Iowa, have invented certain new and useful Improvements in Cream-Separators; and I do declare the following to be a full, clear, and exact description of the invention, such as will enable others skilled in the art to which it appertains to make and use the same.

My invention relates to centrifugal cream separators, and consists in an improved form of device to facilitate the separation of cream from milk. Said device is provided with a series of vertical blades or wings, smooth or corrugated, parts of which are attached to a perforated disk which rests on the bottom of the bowl and under which the whole milk is introduced into the bowl through the central feed tube. The remaining portion of said blades or wings are removable and are adapted to be secured in position by the first-mentioned blades so as to alternate therewith.

In the accompanying drawings which illustrate the invention,—Figure 1 is a vertical longitudinal sectional view of a separator bowl and its bearing and with a portion of the interior mechanism shown in side elevation; Fig. 2 is a transverse sectional view of the same near the top of the bowl; Figs. 3 and 4 are perspective views of the wings or blades, showing the means for securing the same in position, only a portion of said blades being shown in each figure; and Figs. 5, 6 and 7 are enlarged sectional detail views of one form of lower end of the bowl and the bearing therefor.

Referring more particularly to the drawings, which are for illustrative purposes only and are therefore not drawn to scale, 1 indicates the bowl of my separator, which may be constructed in any ordinary manner and is adapted to be operated by the engagement with the ordinary worm gearing 2 at the lower end of the shaft 3 by the ordinary mechanism, not shown. The upper end of the bowl is provided with the usual discharge mechanism, as cones 4 and 5, each provided with outlet openings 6 and 7, respectively.

The bearing for the shaft 3 may be of any desired construction, but I have shown the one for which I made application for Letters-Patent, August 30, 1907, Serial No. 390,697, and, therefore, I make no claims for such bearing in this application. In said construction the bearing is in the form of an inverted cup 8, the interior wall of which at its lower end is screw-threaded and adapted to receive an adjusting nut 9, which is preferably provided with an elongated extension 10, by means of which it is rotated, the extension being preferably provided with ears 11, which may be formed integral therewith and bent laterally at diametrically opposite points. A lock-nut 12 is seated in said bearing below the nut 9 and is adapted to prevent the latter from turning after it has been properly adjusted.

Centrally-mounted through a perforation 13 in the base 14 of the bearing is a neck-bearing 15, through which the shaft 3 is adapted to extend and by means of which it is normally held in axial alinement with the opening 13. The bearing 15 is provided with a collar or flange 16 intermediate its length, the upper face of which is annularly grooved or recessed as shown at 17, which is adapted to normally engage with an annular ridge 18 upon the lower side of the base 14 and normally hold the bearing 15 in said axial alinement. A spring 19 engages with the inner face of the nut 9 and with the lower face of the flange 16 and holds the upper face of said flange into such firm contact with the lower face of the base 14 that it will require considerable lateral pressure to move the bearing 15 out of its axial alinement and which will cause the bearing to resume its normal position the instant said pressure is removed. The contacting surfaces of the groove 17 and ridge 18 are preferably rounded or substantially semi-circular in cross section to permit of this lateral movement of the bearing 15. The ends of the spring are preferably seated in recesses 20 and 21 of the flange 16 and the top of the nut 9, respectively, so as to prevent the bearing 15 from revolving with the bowl spindle or shaft 3. The tension of the spring can be adjusted at any time to adapt the machine to varying conditions by adjusting the nut 9 toward or from the neck-bearing and then rigidly securing it in that position by the lock-nut 12.

In actual use, it has been found advisable to provide the interior of the bowl with vertically arranged wings or blades so arranged as to intercept the outward or radial movement of the milk as it is discharged from the inlet and passes toward the top of the bowl.

By means of such wings the milk is adapted to be spread over a greater surface and thereby permit of the breaking of its globules and the more complete separation of the cream from the milk, but owing to the great number of such wings as has been found desirable to use much difficulty has been experienced in quickly and thoroughly cleansing them after use.

To secure the above results of increased efficiency in separation and to avoid the disadvantages attending the cleansing of such blades I prefer to construct two sets of blades, which may be either plain, curved or corrugated, and permanently fastening the lower ends of one set of blades, as 22, with the conical disk bottom 23 and the inner edge of their upper ends with a band 24. The other blades 25 are secured at their lower ends to a band 26 which encircles their outer edges and is provided with notches or recesses 27 for engaging with the outer edges of the blades 22 and thereby holding the blades of the two sets rigidly in their adjusted or spaced position. The upper ends of the blades 25 are secured at their inner edges to a band 28, which is adapted to encircle the band 24, the inner edges of the blades 25 being far enough away from the center as to pass down over the band 24.

In assembling the blades within the bowl, the series 22 are first placed in position by inserting them until the conical disk 23 rests upon the bottom of the bowl and is held so as to be rotated therewith by means of a projection 29 engaging with a recess 30 in the outer edge of the disk. The other set of blades are then placed in position as by telescoping or interspacing them down between the blades of the first set with the recessed band at the bottom engaging with the edges of the first set. The feed pipe 31 is then placed down through the center of said series with its lower end screw threaded into a hollow boss or projection 32 extending upward from the bottom of the bowl and its upper end provided with a head 33 which is adapted to engage with the bands 24 and 28 and thereby hold the parts rigidly in position.

In using my separator as above described the milk is introduced at the upper end of the feed pipe 31 from whence it passes to the bottom of the bowl and out through perforations 34 into the space formed by the conical disk 23. The milk then passes through perforations 35 arranged at suitable distances in the disk 23, preferably two for each blade, the major portion of the cream passing through the inner holes, more of it and a portion of the cream through the outer row of holes, and the remainder of the milk passing out and upward between the edge of the disk and the wall of the bowl. As the bowl and the blades are rotated in the usual manner, the milk and cream gradually pass upwardly over the blades and upon the wall of the bowl until the milk is discharged at one set of outlets and the cream at the other. When curved blades are used they are preferably rotated with the concaved portion forward which will cause a better result to be obtained than by rotating them in the opposite direction of by using flat radially-arranged blades.

If at any time that the machine is being operated and a greater load is placed upon one portion than another of the bowl, the yielding bearing for the neck or upper end of the bowl shaft will yield sufficiently to accommodate said load, but the bearing will automatically return the bowl to its normal axial position the instant the load is removed.

After the bowl has been used and it is desired to cleanse the parts, the feed tube is unscrewed and withdrawn, after which the two sets of blades can be removed either together or by first withdrawing the outer set and then the inner. When the blades have been thus separated, there is sufficient space between the adjacent blades of each set to permit of quickly and readily cleansing them, and when it is desired to re-assemble them the outer edges of the inner set are caused to enter the recesses in the band of the outer set and thereby prevent any possibility of their being improperly adjusted, even by the most careless manipulation or handling of the parts.

If desired the recesses 28 can be formed by means of plates 36, which are adapted to be secured upon the interior of the band 26. The band 26 may also be separated or divided at any point, as at 37, which will permit of its engaging with the outer edges of the inner blades with a yielding or contracting action.

Although I have described what I consider the best means of constructing my improved separator, yet it is evident that changes and modifications can be made in the form and structure of the different parts and I reserve to myself the right to make all such changes and modifications as will come within the scope of my invention.

Having thus described my invention, what I claim as new and desire to secure by Letters-Patent, is:—

1. In a separator, a bowl, two sets of interspaced blades therein, the upper ends of each set being secured at their inner edges to a band, and means for rigidly securing the lower ends of the two sets at a distance apart.

2. In a separator, a bowl, two sets of interspaced blades therein, the upper ends of the blades of each set being secured at their inner edges to a band, the band of one set encircling the band of the other set, and means for rigidly-securing the lower ends of said blades at a distance apart.

3. In a separator, two sets of interspaced radially-arranged blades therein, the lower ends of the blades of one set being permanently secured to a perforated disk, a band secured to the outer edges of the other set at the bottom and adapted to engage with the outer edges of the first-mentioned set, and means for securing the upper ends of said sets in position.

4. In a cream separator, a bowl, two sets of interspaced blades therein, the lower ends of the blades of one set being permanently secured to a perforated conical disk, a recessed band secured at the lower ends of the outer edges of the blades of the other set with said recesses adapted to be engaged by the outer edges of the first-mentioned set, and means for rigidly securing the upper ends of said blades in position.

5. In a cream separator, a bowl, the bottom of which is provided with a projection, a perforated conical disk, the periphery of which is notched for engaging with said projection, blades rigidly-secured to said disk, a band secured to the inner edges of the upper ends of said blades, a set of blades adapted to be alternately-arranged between the blades of the first-mentioned set, a recessed band secured to the lower end of the outer edges of said second-mentioned blades, a band secured at the inner edge said second-mentioned surround the other band, an ranged axially of said sets of its upper end provided with a h gaging with said bands and its lo adapted to communicate with the inte the bowl below said disk.

6. In a cream separator, a bowl, the bottom of which is provided with a projection and a hollow, perforated, centrally-located projection, a perforated, conical disk, the outer edge of which is recessed for engaging with said first-mentioned projection, radially arranged blades supported by said disk, and a feed tube inserted axially of said sets of blades, the lower end of which is adapted to engage with the hollow projection at the bottom of the bowl and the upper end is provided with means for holding said blades in position.

In testimony whereof I have hereunto set my hand in presence of two subscribing witnesses.

EDGERLY R. BAILEY.

Witnesses:
J. E. PAINTER,
A. B. LORANZ.